(12) United States Patent
Leighton et al.

(10) Patent No.: US 6,256,161 B1
(45) Date of Patent: Jul. 3, 2001

(54) ECHO CANCELLATION FOR DISK DRIVE READ CIRCUIT

(75) Inventors: John D. Leighton, Anoka; Sally A. Doherty, Afton, both of MN (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/385,788

(22) Filed: Aug. 30, 1999

Related U.S. Application Data

(60) Provisional application No. 60/135,006, filed on May 20, 1999.

(51) Int. Cl.$^7$ ........................................................ G11B 5/02
(52) U.S. Cl. .................................................. 360/67; 360/53
(58) Field of Search ..................................... 455/305, 306; 330/149, 292; 379/406, 410; 386/114, 76; 360/67, 46, 53, 65, 246

(56) References Cited

U.S. PATENT DOCUMENTS 4,914,398 * 4/1990 Jove et al. ............................. 360/67
5,852,521 * 12/1998 Umeyama et al. ..................... 360/65
6,046,876 * 4/2000 Osafune et al. ........................ 360/67

* cited by examiner

*Primary Examiner*—Alan T. Faber
(74) *Attorney, Agent, or Firm*—Kinney & Lange, P.A.

(57) ABSTRACT

Echo cancellation is provided in a disk drive circuit having a transducing head connected to a preamplifier circuit by an electrical interconnect with a first time delay, a first interface between the preamplifier and the electrical interconnect having a first reflection coefficient and a second interface between the transducing head and the electrical interconnect having a second reflection coefficient. The echo cancellation technique delays a preamplifier output signal with a second time delay, the second time delay being double the first time delay. The preamplifier output signal is also filtered so as to simulate the effects of the first and second reflection coefficients. The delayed and filtered signal is then subtracted from the preamplifier output signal, thereby removing echo content from the signal.

7 Claims, 7 Drawing Sheets

ECHO CANCELLATION FOR DISK DRIVE READ CIRCUIT

CROSS-REFERENCE TO RELATED APPLICATION(S)

This application claims priority from Provisional Application No. 60/135,006 filed May 20, 1999 entitled "Echo Cancellation for MR Readers" by J. Leighton and S. Doherty.

BACKGROUND OF THE INVENTION

The present invention relates to a disk drive read circuit, and more particularly to an echo cancellation system employed in the disk drive read circuit to improve the quality of a signal detected by a transducing read head from a data track of a disk.

In the current state of technology, large amounts of data may be stored on data tracks of a rotatable disk as encoded magnetic transitions representing logical binary 0's and 1's. These magnetic transitions are detected, or read, by a sensor, or transducing head, suspended over the surface of the disk as it rotates. The sensor provides an input signal based on the detected magnetic transitions on the disk to preamplifier circuitry located at a distance from the sensor, with an electrical interconnect being provided between the sensor and the preamplifier circuitry. FIG. 1 is a simplified illustration of the underside of a typical disk drive configuration, including support structure 12 carrying slider 14 including transducing head 16 over the surface of a rotating disk. Sensor 16 is electrically connected to preamplifier circuit 20 by interconnect 18.

One problem with disk drive systems such as the one shown in FIG. 1 is that the input signal provided by head 16 is reflected by preamplifier circuit 20 due to an impedance mismatch between interconnect 18 and preamplifier circuit 20, and then reflected again by head 16 due to an impedance mismatch between interconnect 18 and head 16. As a result, the composite signal received by preamplifier circuit 20 includes both the true input signal and a delayed, distorted version of the input signal, which degrades the accuracy of the disk drive system in detecting magnetic transitions from the rotating disk. FIG. 2 illustrates the signal generated by head 16 as it travels and is reflected between head 16 and preamplifier circuit 20 along interconnect 18. The original input signal 22 is generated by head 16, and after one propagation delay (T) is received as signal 23 at preamplifier circuit 20. Signal 23 is the desired, undistorted signal that accurately represents the data transitions encoded on the magnetic disk. However, because interconnect 18 is not impedance matched to preamplifier circuit 20, the incoming signal is partially reflected back along interconnect 18 to head 16. Reflected signal 24 is received by head 16 after another propagation delay (T), and is attenuated and distorted based on the reflection coefficient of the preamplifier/interconnect interface ($K_{PA}$). Reflected signal 24 is again reflected due to the impedance mismatch between head 16 and interconnect 18, resulting in re-reflected signal 25 being received at preamplifier circuit 20 one more propagation delay (T) later. Re-reflected signal 25 is further attenuated and distorted according to the reflection coefficient of the head/interconnect interface ($K_{MR}$). The reflection process continues until the attenuation of the signal reaches negligible levels, and composite signal 26 received by preamplifier circuit 20 therefore includes undesirable reflected components that degrade the circuit's ability to accurately detect data transitions encoded on the disk.

One potential solution to the reflection problem is to impedance match either the preamplifier/interconnect interface or the head/interconnect interface. However, impedance matching the preamplifier/interconnect interface inherently introduces additional noise into the system, and because of the low signal levels utilized in disk drive technology, such impedance matching would reduce the signal-to-noise ratio of the system to an unacceptable level. Impedance matching the head/interconnect interface is not practical because the impedance of the head is not a tightly controlled parameter in manufacturing. Therefore, there is a need in the art for a solution that eliminates undesired reflected signals at the disk drive preamplifier while maintaining an acceptable signal-to-noise ratio to accurately detect the data transition signals encoded on the disk.

BRIEF SUMMARY OF THE INVENTION

The present invention is an echo cancellation circuit and technique for use in a disk drive circuit having a transducing head connected to a preamplifier circuit by an electrical interconnect with a first time delay, a first interface between the preamplifier and the electrical interconnect having a first reflection coefficient and a second interface between the transducing head and the electrical interconnect having a second reflection coefficient. The echo cancellation circuit delays a preamplifier output signal with a second time delay, the second time delay being double the first time delay. The preamplifier output signal is also filtered so as to simulate the effects of the first and second reflection coefficients. The delayed and filtered signal is then subtracted from the preamplifier output signal, thereby removing echo content from the signal.

DETAILED DESCRIPTION

Figure 1:
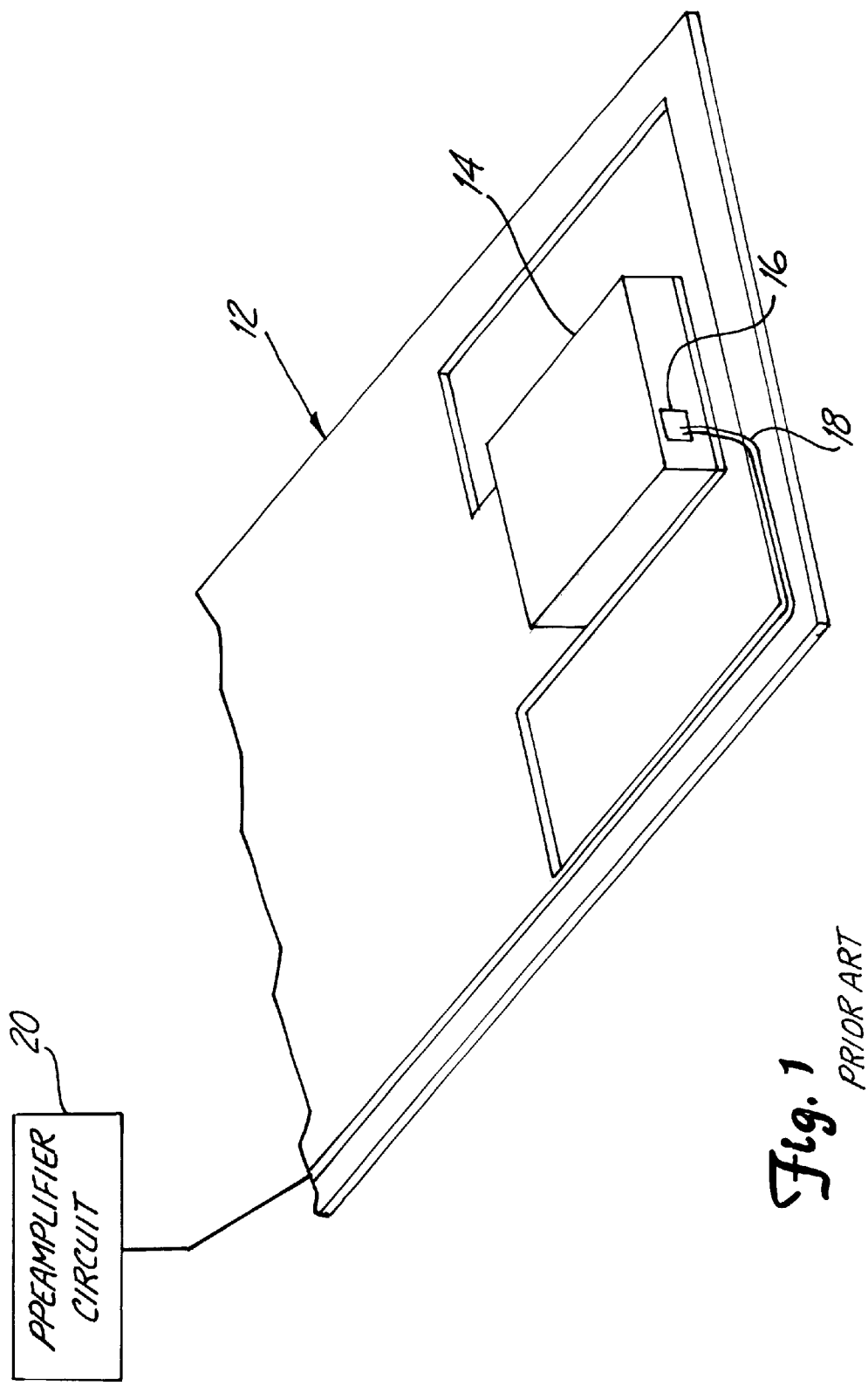
FIG. 1 is a simplified perspective view illustrating a typical disk drive structure for transducing data with a rotatable disk.
Figure 2:
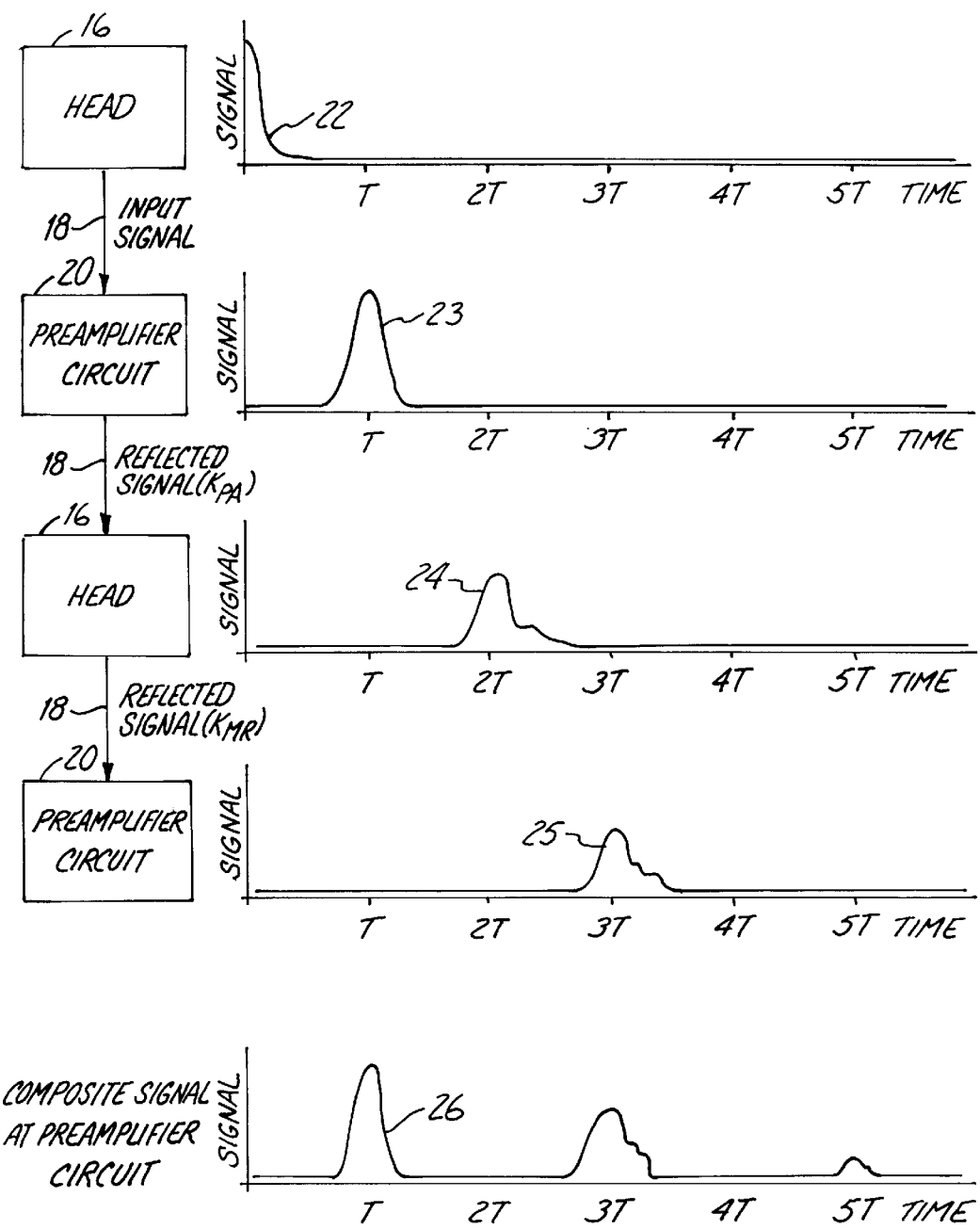
FIG. 2 is a diagram including several graphs illustrating the signals received by the components of the disc drive structure of FIG. 1.
Figure 3:
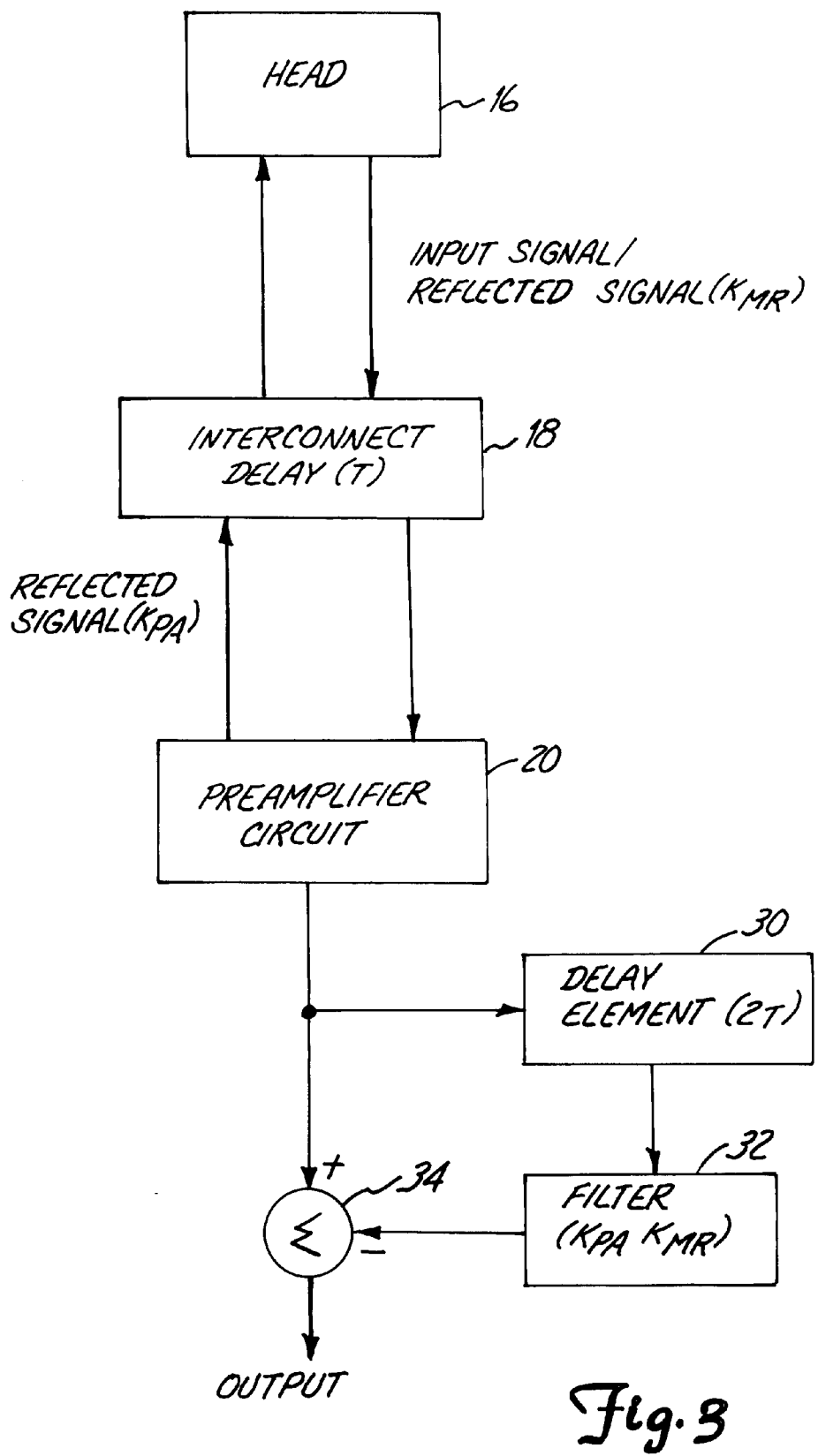
FIG. 3 is a block diagram illustrating the functional components of the disk drive system configured according to the present invention.

FIGS. 1 and 2 illustrate the general structure and performance of conventional disk drive configurations, and the problems therewith are discussed above. FIG. 3 is a block diagram illustrating the functional components of the disk drive system configured according to the present invention, and is arranged to show the path of the input signal as it propagates between the components of the system. Head 16 generates the original input signal based on detected magnetic transitions on the disk. The input signal undergoes a propagation delay (T) as it travels along interconnect 18, and is then received by preamplifier circuit 20. This signal received by preamplifier circuit 20 is the desired, undistorted signal that accurately represents the magnetic transitions encoded on the disk. Because preamplifier circuit 20 is impedance mismatched with interconnect 18, though, a reflected signal travels back along interconnect 18 with its associated propagation delay (T) to head 16. The reflected signal is attenuated and distorted based on the reflection coefficient of the preamplifier/interconnect interface ($K_{PA}$). Again, because head 16 is impedance mismatched with interconnect 18, a reflected signal travels along interconnect 18 with a propagation delay (T) toward preamplifier circuit 18. This reflected signal is attenuated and distorted based on the reflection coefficient of the head/interconnect interface ($K_{MR}$). Without compensation, preamplifier circuit 20 would receive the reflected signal in the usual manner, and disk drive performance would be degraded thereby.

In order to compensate for the reflection of signals in the disk drive circuit, the actual signal including echo content received by preamplifier circuit 20 is provided to delay element 30, having a delay equal to double the propagation delay of interconnect 18 (2T). The delayed signal is then attenuated and distorted by filter 32, which is designed to simulate the combined attenuation and distortion effects due to the impedance mismatch at the preamplifier/interconnect interface ($K_{PA}$) and the impedance mismatch at the head/interconnect interface ($K_{MR}$). Filter 32 therefore has a filtering coefficient equal to the product of the two reflection coefficients ($K_{PA}K_{MR}$). The filtered signal is therefore equivalent to the delayed and distorted signal received by preamplifier circuit 20 due to reflection. The signal received by preamplifier circuit 20 can therefore be reduced to merely the desired signal by subtracting out the filtered signal, represented by summer 34 which combines the reflected signal and the inverse of the filtered signal. This technique may be broadly characterized as "echo cancellation," and serves to ensure that preamplifier circuit 20 receives only the desired signal from the head, accurately representing the magnetic transitions encoded on the disk. The values of reflection coefficients $K_{PA}$ and $K_{MR}$ are both readily ascertainable by empirical measurement techniques known in the art.

Figure 4:
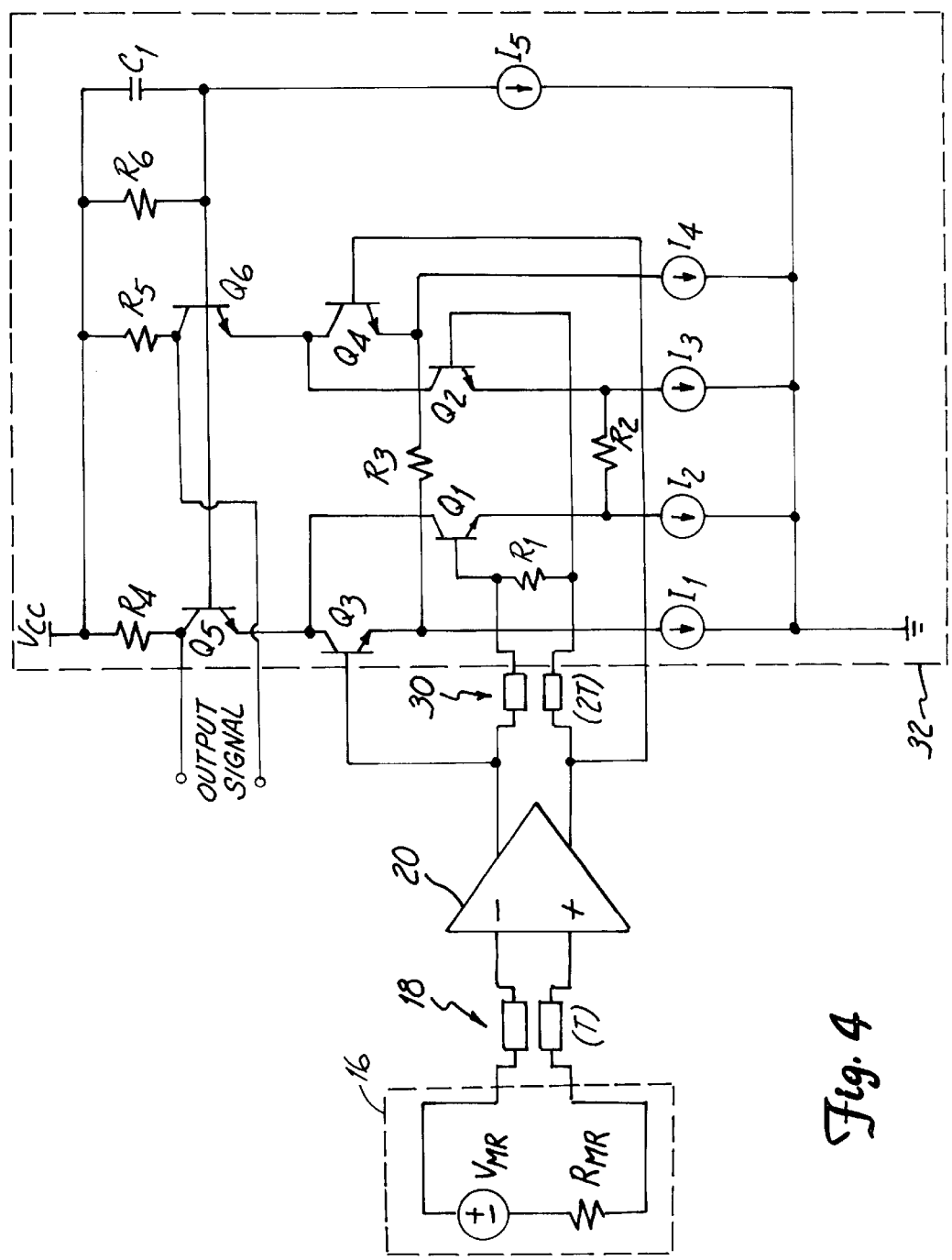
FIG. 4 is a schematic diagram of a circuit implementing the disk drive system according to a first embodiment of the present invention.

FIG. 4 is a schematic diagram of a circuit implementing the disk drive system of a first embodiment of the present invention. Head 16 is represented as resistor $R_{MR}$ and the signal voltage induced in the head is represented as voltage source $V_{MR}$, interconnect 18 is represented as a transmission line, and preamplifier circuit 20 is represented as a simple amplifier having negative and positive inputs and outputs. Delay element 30 is represented as a transmission line having a propagation delay of 2T, twice the propagation delay of interconnect 18. The transmission line of delay element 30 matches the impedance of the transmission line of interconnect 18, but has twice the length to provide twice the propagation delay. In the embodiment shown in FIG. 4, filter 32 is implemented as a cascade amplifier having a gain that is controlled by the selected values of resistors $R_2$, $R_3$, $R_4$ and $R_5$. In a preferred embodiment, resistors $R_4$ and $R_5$, are matched for optimum performance. This filter configuration is appropriate for the situation where the product of the reflection coefficients of the preamplifier ($K_{PA}$) and the head ($K_{MR}$) is real (that is, the net reflection of the input signal is frequency independent). This situation will occur when the impedance of the preamplifier circuit ($Z_{PA}$) is real (that is, wholly resistive). Resistor $R_1$ is provided across the output side of delay element 30 to impedance match filter 32 with the transmission line of delay element 30. Because the signal representing magnetic disk transitions has already been amplified by preamplifier 20, the additional noise generated by impedance matching filter 32 with delay element 30 does not significantly affect the signal-to-noise ratio of the system. Filter 32 also includes transistors $Q_3$ and $Q_4$ having bases connected to the outputs of preamplifier 20, transistors $Q_1$ and $Q_2$ having bases connected to the output side of delay element 30, and transistors $Q_5$ and $Q_6$ having common bases and emitters connected to respective collectors of transistors $Q_3$ and $Q_1$ and transistors $Q_4$ and $Q_2$. Current sources $I_1$, $I_2$, $I_3$ and $I_4$ are connected to the respective emitters of transistors $Q_3$, $Q_1$, $Q_2$ and $Q_4$, and current source $I_5$ is connected to the common bases of transistors $Q_5$ and $Q_6$. Resistors $R_4$ and $R_5$, are connected between the respective collectors of transistors $Q_5$ and $Q_6$ and a fixed voltage level. Resistor $R_6$ and capacitor $C_1$ are connected between the common bases of transistors $Q_5$ and $Q_6$ and the fixed voltage level.

In operation, the undelayed signal from preamplifier 20 is delivered to transistors $Q_3$ and $Q_4$, and is amplified with a gain controlled by the value of resistor $R_3$ connected between the emitters of transistors $Q_3$ and $Q_4$. The gain of the undelayed signal maybe determined by the following equation, where $R_e$ represents the emitter resistance of each of transistors $Q_3$ and $Q_4$:

$$Gain_{(undelayed)} = \frac{R_4 + R_5}{R_3 + 2R_e} \quad \text{(Eq. 1)}$$

Similarly, the delayed signal from delay element 30 is delivered to transistors $Q_1$ and $Q_2$, and is amplified with a gain controlled by the value of resistor $R_2$ connected between the emitters of transistors $Q_1$ and $Q_2$. The gain of the delayed signal may be determined by the following equation:

$$Gain_{(delayed)} = \frac{R_4 + R_5}{R_2 + 2R_e} \quad \text{(Eq. 2)}$$

The delayed and undelayed signals are then effectively summed at transistors $Q_5$ and $Q_6$, which in a voltage-sense preamplifier system is appropriate to achieve the desired subtraction of the delayed signal from the undelayed signal. In a current sense preamplifier system, opposite connections would be made (connecting the collectors of $Q_3$ and $Q_2$ and of $Q_4$ and $Q_1$) to achieve the desired subtraction of the delayed signal from the undelayed signal. As a result, the output signal at the collectors of transistors $Q_5$ and $Q_6$ is an exact representation of the true signal input to preamplifier 20, with reflected signal components removed.

For a situation where the reflection coefficient product ($K_{PA}K_{MR}$) is complex (that is, the reflection coefficients are frequency dependent), a slightly more complex filter design process must be performed. More specifically, the $K_{PA}K_{MR}$ product can be realized by a sum of filters having appropriate poles and zeroes to simulate the reflection response. This filter design process is within the expertise of one of ordinary skill in the art; however, for clarity, a simple example of the process is described below.

The $K_{PA}K_{MR}$ product is complex (frequency dependent) when the impedance of the preamplifier is complex. One simple example is a case where the preamplifier exhibits a characteristic impedance ($Z_{PA}$) of a resistor in parallel with a capacitor. Thus, the characteristic impedance is $R_{PA}$ in parallel with the reciprocal of $j\omega C_{PA}$, which is represented by:

$$Z_{PA} = \frac{R_{PA}}{1 + j\omega R_{PA} C_{PA}} \quad \text{(Eq. 3)}$$

The reflection coefficient associated with the preamplifier ($K_{PA}$) is defined as follows:

$$K_{PA} = \frac{Z_{PA} - Z_{TL}}{Z_{PA} + Z_{TL}} \quad \text{(Eq. 4)}$$

where $Z_{TL}$ is the characteristic impedance of the transmission line of interconnect 18. Inserting the value of $Z_{PA}$ determined in Eq. 3 yields the following:

$$K_{PA} = \frac{(R_{PA} - Z_{TL}) - j\omega R_{PA} C_{PA} Z_{TL}}{(R_{PA} + Z_{TL}) + j\omega R_{PA} C_{PA} Z_{TL}} \quad \text{(Eq. 5)}$$

which can be manipulated into a form appropriate for identifying low pass and high pass filter characteristics as follows:

$$K_{PA} = \frac{R_{PA} - Z_{TL}}{(R_{PA} + Z_{TL}) + j\omega C_{PA} R_{PA} Z_{TL}} + \frac{-j\omega C_{PA} R_{PA} Z_{TL}}{(R_{PA} + Z_{TL}) + j\omega C_{PA} R_{PA} Z_{TL}} \quad \text{(Eq. 6)}$$

The first term of Eq. 6 represents a low pass filter characteristic and the second term of Eq. 6 represents a high pass filter characteristic, which may be realized in a conventional manner by known filter circuit components to achieve the proper performance. For example, the low pass filter may be realized by the filter circuit shown in FIG. 5, and the high pass filter may be realized by the filter circuit shown in FIG. 6.

Figure 5:
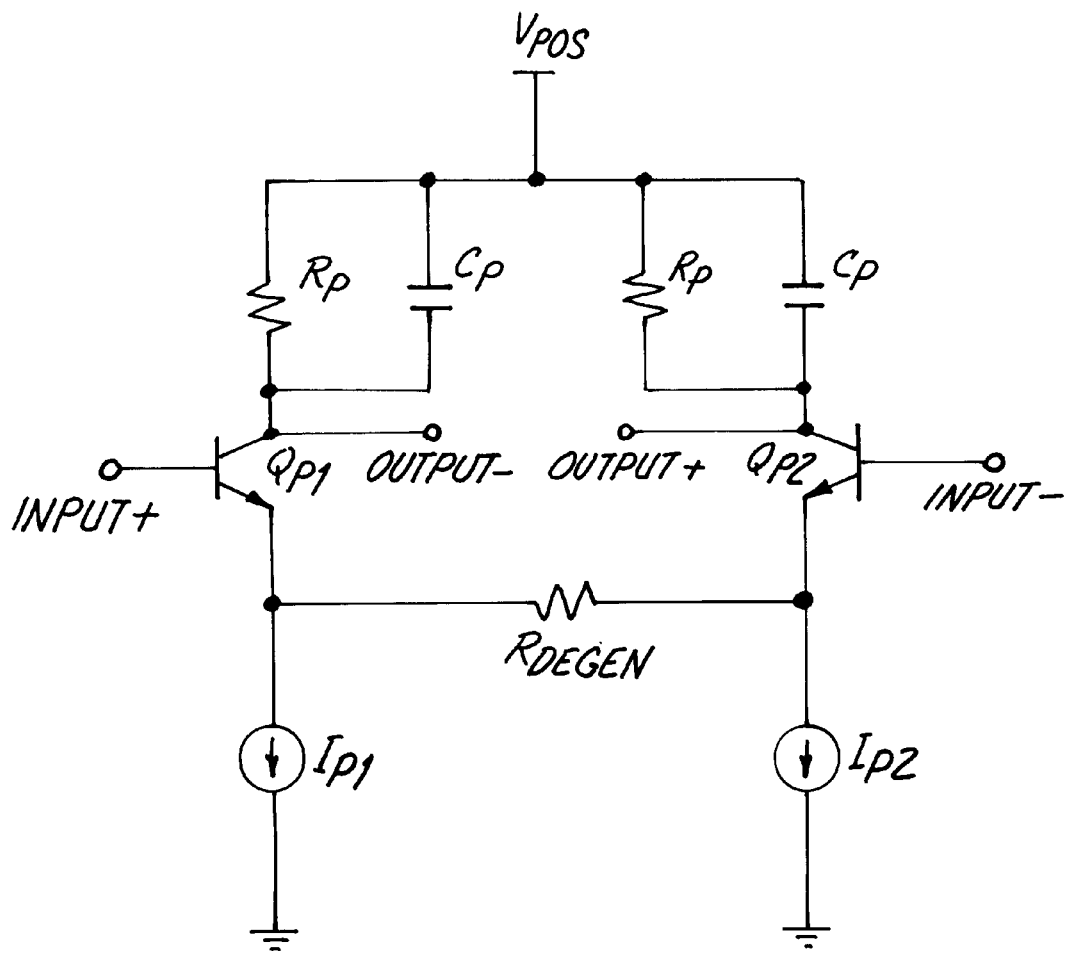
FIG. 5 is a schematic diagram illustrating a filter circuit for realizing the characteristic of a low-pass filter according to a second embodiment of the present invention.

FIG. 5 is a schematic diagram illustrating a filter circuit for realizing the low pass filter characteristic determined by Eq. 6 above. The circuit includes positive and negative inputs connected to the bases of transistors $Q_{P1}$ and $Q_{P2}$, respectively. The collector of transistor $Q_{P1}$, is the negative output signal, and is connected through resistor $R_P$ and capacitor $C_P$ connected in parallel to fixed voltage level $V_{POS}$. The collector of transistor $Q_{P2}$ is the positive output signal, and is connected through another resistor $R_P$ and capacitor $C_P$ connected in parallel to fixed voltage level $V_{POS}$. The emitters of transistors $Q_{P1}$ and $Q_{P2}$ are connected to each other through degeneration resistor $R_{DEGEN}$, with the emitter of transistor $Q_{P1}$ being connected to ground through current source $I_{P1}$ and the emitter of transistor $Q_{P2}$ being connected to ground through current source $I_{P2}$. The values of the components of the filter circuit shown in FIG. 5 may be selected in a manner known in the art to realize the characteristic performance of a low pass filter at a desired frequency, in accordance with the low pass filter characteristic determined in Eq. 6 above.

Figure 6:
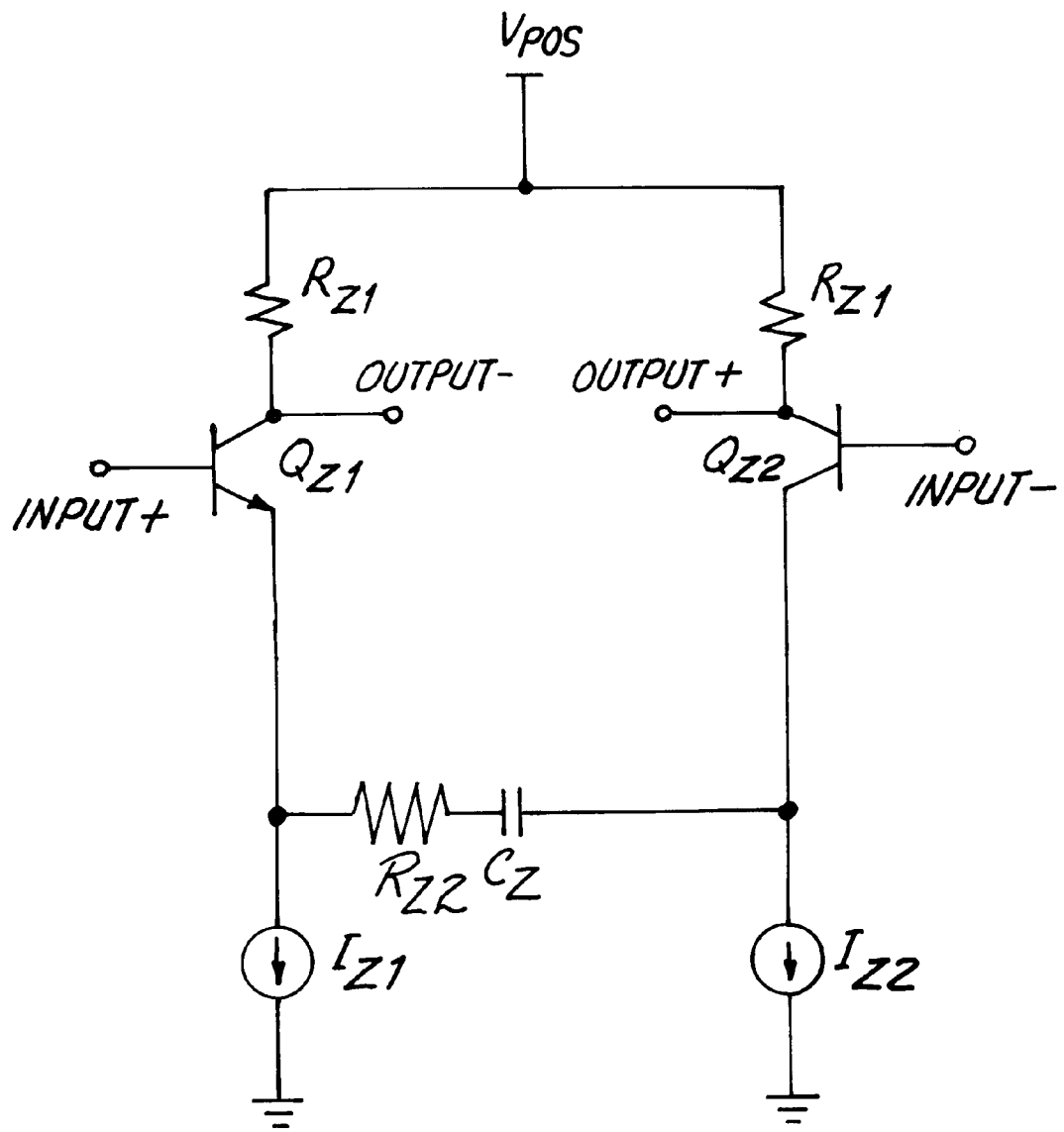
FIG. 6 is a schematic diagram illustrating a filter circuit for realizing the characteristic of a high-pass filter according to the second embodiment of the present invention.

FIG. 6 is a schematic diagram illustrating a filter circuit for realizing the high pass filter characteristic determined by Eq. 6 above. The circuit includes positive and negative inputs connected to the bases of transistors $Q_{Z1}$ and $Q_{Z2}$, respectively. The collector of transistor $Q_{Z1}$ is the negative output signal, and is connected through resistor $R_{Z1}$ to fixed voltage level $V_{POS}$. The collector of transistor $Q_{Z2}$ is the positive output signal, and is connected through another resistor $R_{Z1}$ to fixed voltage level $V_{POS}$. The emitters of transistors $Q_{Z1}$ and $Q_{Z2}$ are connected to each other through resistor $R_{Z2}$ and capacitor $C_Z$ connected in series, with the emitter of transistor $Q_{Z1}$ being connected to ground through current source $I_{Z1}$ and the emitter of transistor $Q_{Z2}$ being connected to ground through current source $I_{Z2}$. The values of the components of the filter circuit shown in FIG. 6 may be selected in a manner known in the art to realize the characteristic performance of a high pass filter at a desired frequency, in accordance with the high pass filter characteristic determined in Eq. 6 above.

Figure 7:
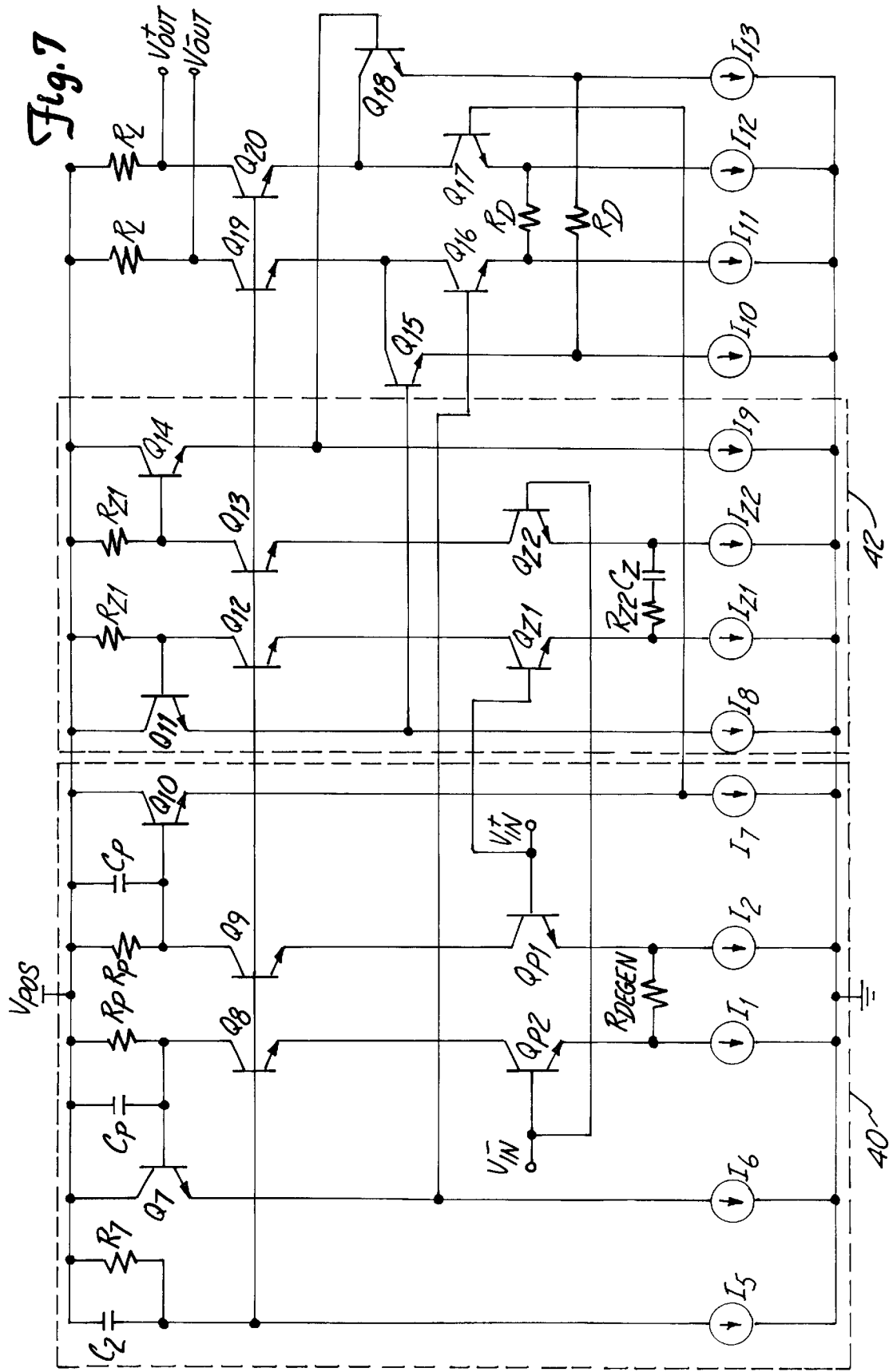
FIG. 7 is a schematic diagram illustrating a complete filter circuit incorporating the basic filter designs shown in FIGS. 5 and 6.

FIG. 7 is a schematic diagram illustrating a complete filter circuit incorporating the basic filter designs shown in FIGS. 5 and 6. First filter stage 40 is implemented to realize the characteristic of a low pass filter (as described above with respect to FIG. 5) and second filter stage 42 is implemented to realize the characteristic of a high pass filter (as described above with respect to FIG. 6). Positive and negative inputs are connected to the bases of transistors $Q_{P1}$ and $Q_{P2}$, respectively, which are tied to the respective bases of transistors $Q_{Z1}$ and $Q_{Z2}$ as well. The emitters of transistors $Q_{P1}$ and $Q_{P2}$ are connected to ground through respective current sources $I_{P1}$ and $I_{P2}$, and degeneration resistor $R_{DEGEN}$ is connected between the emitters of transistors $Q_{P1}$ and $Q_{P2}$. The collector of transistor $Q_{P1}$ is connected to the emitter of transistor $Q_9$, whose collector is in turn connected through resistor $R_P$ and capacitor $C_P$ connected in parallel to fixed voltage level $V_{POS}$. Likewise, the collector of transistor $Q_{P2}$ is connected to the emitter of transistor $Q_8$, whose collector is in turn connected through another resistor $R_P$ and capacitor $C_P$ connected in parallel to fixed voltage level $V_{POS}$. The collector of transistor $Q_8$ is connected to the base of transistor $Q_7$, which has a collector connected to fixed voltage level $V_{POS}$ and an emitter connected through current source $I_6$ to ground. The collector of transistor $Q_9$ is connected to the base of transistor $Q_{10}$, which has a collector connected to fixed voltage level $V_{POS}$ and an emitter connected through current source $I_7$ to ground. The bases of transistors $Q_8$ and $Q_9$ are tied together and connected through current source $I_5$ to ground, and also through resistor $R_7$ and capacitor $C_2$ connected in parallel to fixed voltage level $V_{POS}$.

The emitters of transistors $Q_{Z1}$ and $Q_{Z2}$ are connected to ground through respective current sources $I_{Z1}$, and $I_{Z2}$, and degeneration resistor $R_{Z2}$ and degeneration capacitor $C_Z$ are connected in series between the emitters of transistors $Q_{Z1}$, and $Q_{Z2}$ The collector of transistor $Q_{Z1}$ is connected to the emitter of transistor $Q_{12}$, whose collector is in turn connected through resistor $R_{Z1}$ to fixed voltage level $V_{POS}$. Likewise, the collector of transistor $Q_{Z2}$ to the emitter of transistor $Q_3$, whose collector is in turn connected through another resistor $R_{Z1}$ to fixed voltage level $V_{POS}$. The collector of transistor $Q_{12}$ is connected to the base of transistor $Q_{11}$, which has a collector connected to fixed voltage level $V_{POS}$ and an emitter connected through current source $I_8$ to ground. The collector of transistor $Q_{13}$ is connected to the base of transistor $Q_{14}$, which has a collector connected to fixed voltage level $V_{POS}$ and an emitter connected through current source $I_9$ to ground. The bases of transistors $Q_{12}$ and $Q_{13}$ are tied together and common to the bases of transistors $Q_8$ and $Q_9$.

The emitter of transistor $Q_{11}$ is connected to the base of transistor $Q_{15}$, the emitter of transistor $Q_7$ is connected to the base of transistor $Q_{16}$, the emitter of transistor $Q_{10}$ is connected to the base of transistor $Q_{17}$, and the emitter of transistor $Q_{14}$ is connected to the base of transistor $Q_8$. The collectors of transistors $Q_{15}$ and $Q_{16}$ are tied together and connected to the emitter of transistor $Q_{19}$, which has a collector connected through resistor $R_L$ to fixed voltage level $V_{POS}$. The collectors of transistors $Q_{17}$ and $Q_{18}$ are tied together and connected to the emitter of transistor $Q_{20}$, which has a collector connected through another resistor $R_1$ to fixed voltage level $V_{POS}$. The bases of transistors $Q_{19}$ and $Q_{20}$ are tied together and common to the bases of transistors $Q_8$, $Q_9$, $Q_{12}$ and $Q_{13}$. The emitters of transistors $Q_{15}$, $Q_{16}$, $Q_{17}$ and $Q_{18}$ are connected to ground through respective current sources $I_{10}$, $I_{11}$, $I_{12}$ and $I_{13}$. Degeneration resistor $R_D$ is connected between the emitters of transistors $Q_{15}$ and $Q_{18}$, and another degeneration resistor $R_D$ is connected between the emitters of transistors $Q_{16}$ and $Q_{17}$. The positive output of the circuit is at the collector of transistor $Q_{20}$, and the negative output of the circuit is at the collector of transistor $Q_{19}$.

The gain of first stage 40 of the circuit shown in FIG. 7 is governed by the following equation:

$$Gain_{(stage1)} = \frac{2R_P}{R_{DEGEN} + 2R_e}\left(\frac{1}{1+j\omega R_P C_P}\right) \quad (Eq.\ 7)$$

where $R_e$ represents the emitter resistance of transistors $Q_{P1}$ and $Q_{P2}$, and the gain of second stage 42 of the circuit shown in FIG. 7 is governed by the following equation:

$$Gain_{(stage2)} = \frac{2j\omega C_Z R_{Z1}}{1+j\omega C_Z(R_{Z2}+2R_e)} \quad (Eq.\ 8)$$

where $R_e$ represents the emitter resistance of transistors $Q_{Z1}$ and $Q_{Z2}$.

The remaining portion of the circuit shown in FIG. 7 is a third stage serving to effectively combine the first and second filter stages as follows:

$$V_{OUT} = V_{IN}(Gain_{(stage1)} - Gain_{(stage2)})\frac{2R_L}{R_D + 2R_e} \quad (Eq.\ 9)$$

The output signal ($V_{OUT}$) represents the filtered and delayed signal, which then is subtracted from the undelayed preamplifier output signal by a summing circuit similar to the third stage of the circuitry shown in FIG. 7, as known in the art. The resulting output signal therefore has echo content removed, representing the true disc drive signal and thereby enabling optimum performance of the disc drive system.

As demonstrated by the example described above, a filter or filters may be provided to mimic the reflection characteristic of the preamplifier and the head of the disc. It will be understood by those skilled in the art that conventional filter design techniques, similar to the techniques shown in the example described above, may be utilized to mimic nearly any reflection characteristic. The present invention utilizes this capability to implement echo cancellation, so that the preamplifier receives a signal that exactly represents the desired signal transmitted from the head, with any reflected content removed. This is achieved by delaying the true signal initially transmitted to the preamplifier by an amount equal to the delay in the reflection path, which is two interconnect delay time constants (representing the amount of time required for reflected signal to travel back to the head and the re-reflected signal to travel from the head to the preamplifier). The delayed signal is then acted upon by the appropriately designed filter to mimic the distortion of the actual reflected signal, so that the output of the filter is an exact representation of the actual reflected signal. The filter output is then subtracted from the composite signal received by the preamplifier, so that the preamplifier circuit will receive only the desired signal transmitted from the head without any of the reflected signal content. The present invention therefore enables the disc drive system to detect magnetic transitions encoded on the disc with improved accuracy, which improves the performance of the disc drive and provides the ability to store more data on the disc.

Although the present invention has been described with reference to preferred embodiments, workers skilled in the art will recognize that changes may be made in form and detail without departing from the spirit and scope of the invention.

What is claimed is:

1. An echo cancellation circuit for a read preamplifier of a disk drive having a transducing head connected to the preamplifier by an electrical interconnect having a first time delay, a first interface between the preamplifier and the electrical interconnect having a first reflection coefficient and a second interface between the transducing head and the electrical interconnect having a second reflection coefficient, the preamplifier receiving a composite signal comprising a first signal from the transducing head and a reflection signal based on a reflection of the first signal by the first and second interfaces, the reflection signal being delayed from the first signal by the electrical interconnect, the echo cancellation circuit comprising:

a delay element for connection to the preamplifier, the delay element having a second time delay double the first time delay to provide a delay signal delayed from the first signal;

a filter for stimulating effects of the first and second reflection coefficients on the delay signal; and a summing circuit for subtracting the filtered delay signal from the composite signal.

2. The echo cancellation circuit of claim 1, wherein the delay element comprises a transmission line having a characteristic impedance equal to a characteristic impedance of the electrical interconnect.

3. The echo cancellation circuit of claim 1, wherein the filter is impedance matched to the delay element.

4. The echo cancellation circuit of claim 1, wherein the delay element is connected to an output of the preamplifier.

5. A method of conditioning a preamplifier output signal in a disk drive system having a transducing head connected to a preamplifier circuit by an electrical interconnect with a first time delay, a first interface between the preamplifier and the electrical interconnect having a first reflection coefficient and a second interface between the transducing head and the electrical interconnect having a second reflection coefficient, the method comprising:

delaying the preamplifier output signal with a second time delay, the second time delay being double the first time delay;

filtering the preamplifier output signal so as to simulate the effects of the first and second reflection coefficients; and subtracting the delayed and filtered signal from the preamplifier output signal.

6. The method of claim 5, wherein the step of delaying the preamplifier output signal comprises providing a transmission line having a characteristic impedance equal to a characteristic impedance of the electrical interconnect and a length double a length of the electrical interconnect.

7. The method of claim 5, wherein the step of filtering the preamplifier output signal comprises providing a filter circuit that is impedance matched to the transmission line.

\* \* \* \* \*

UNITED STATES PATENT AND TRADEMARK OFFICE
CERTIFICATE OF CORRECTION

PATENT NO.    : 6,256,161 B1
DATED         : July 3, 2001
INVENTOR(S)   : John D. Leighton et al.

It is certified that error appears in the above-identified patent and that said Letters Patent is hereby corrected as shown below:

<u>Column 8,</u>
Line 29, delete "stimulating", insert -- simulating --

Signed and Sealed this

Twenty-sixth Day of February, 2002

Attest:

Attesting Officer

JAMES E. ROGAN
*Director of the United States Patent and Trademark Office*